Jan. 22, 1935. E. F. ENGELKE 1,988,648
PROCESS FOR PRODUCING A REFINED LUBRICANT FROM CRUDE PETROLEUM OIL
Filed June 25, 1929
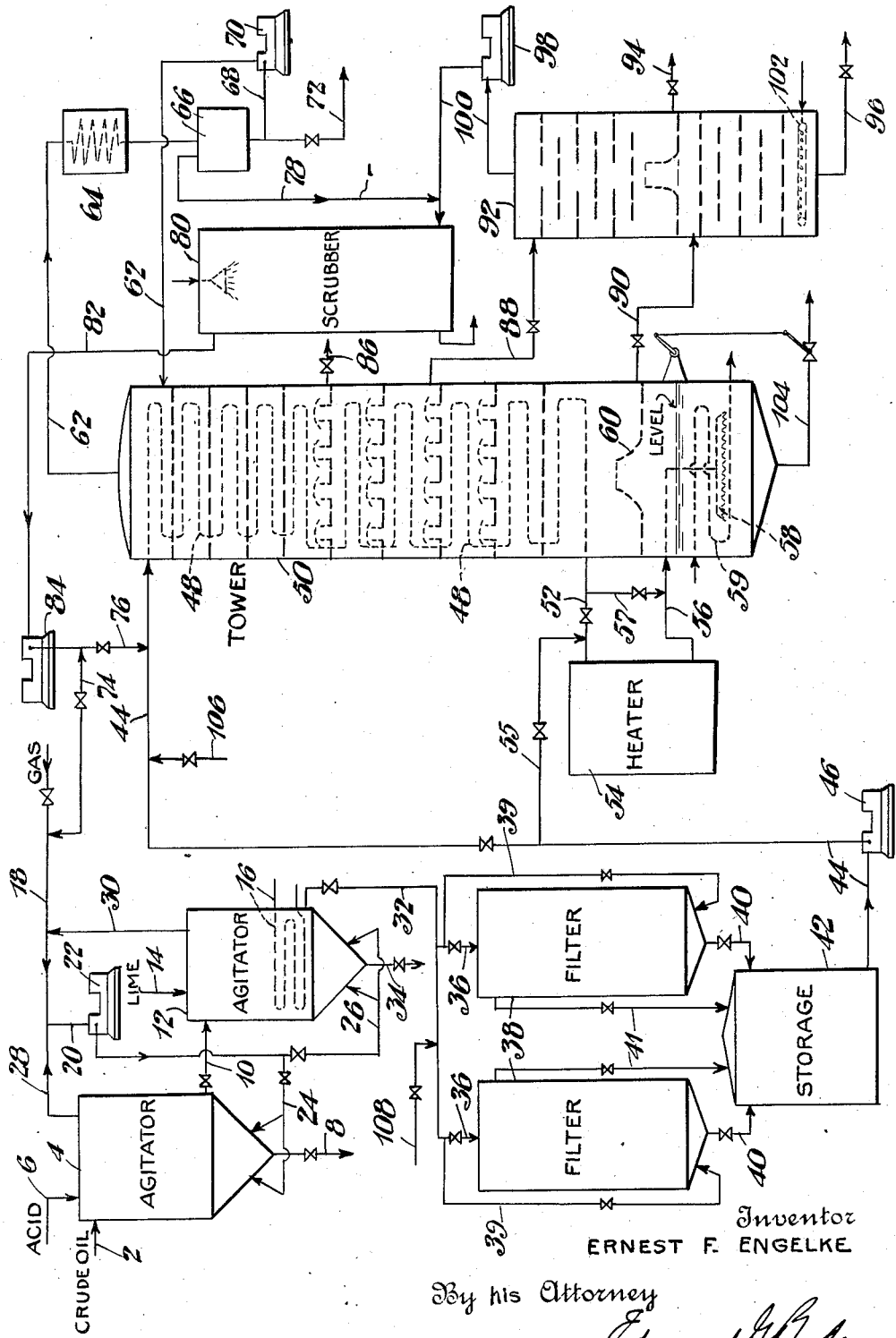
Inventor
ERNEST F. ENGELKE
By his Attorney
Edmund G. Borden Patented Jan. 22, 1935

1,988,648

UNITED STATES PATENT OFFICE 1,988,648

PROCESS FOR PRODUCING A REFINED LUBRICANT FROM CRUDE PETROLEUM OIL

Ernest F. Engelke, Camden, N. J., assignor, by mesne assignments, to Doherty Research Company, New York, N. Y., a corporation of Delaware Application June 25, 1929, Serial No. 373,549

3 Claims. (Cl. 196—38)

The present invention relates to the refining of crude oils primarily for the production of lubricants.

Lubricating oils are commonly produced from crude oil by first skimming the oil of all light fractions including gas oil, after which the bottoms are distilled with steam or under a vacuum to take over certain of the lighter lubricants which may be vaporized under such conditions. The bottoms from the last distillation as well as the distillates are then dewaxed (if the crude is a paraffine base oil), treated with acid and alkali and finally diluted with naphtha and filtered through fuller's earth or other decolorizing clay. Since most crudes contain asphaltic and other easily decomposable materials, the treatment of the oil by the above procedure gives distillates and residues which are contaminated with asphaltic substances or other decomposition products. This contamination increases the amounts of treating materials and decolorizing clay necessary for the production of suitable marketable products which are unstable to light and contain constituents which readily decompose at temperatures under which they are used.

The primary object of the present invention is the production of a process for refining crude oils which will avoid the disadvantages referred to and produce directly from crude oil, lubricants which are stable under the conditions in which they are used.

The invention with further objects and advantages will be best understood from the following detailed description taken in connection with the accompanying drawing in which:

The figure is a diagrammatic showing partly in vertical elevation of an apparatus adapted for carrying out the improved process.

The crude oil to be treated in accordance with the process of the present invention may be either paraffin, asphaltic or mixed base crude. The oil is first treated with sulphuric acid in an ordinary type of agitator after which the oil is neutralized and further treated for the removal of sulphonic acid and other sulphuric acid derivatives, by being brought into contact with lime. It has been found that the sulphonic acids cannot be removed with an ordinary alkali wash. The oil is next treated with decolorizing clay in order to remove the last traces of the lime and to decolorize the oil, after which the substantially purified crude oil is distilled for the production of various fractions such as gasoline, kerosene, gas oil and the various lubricating products obtainable from the particular crude oil being treated.

Referring to the drawing, the oil to be treated is introduced from storage through a pipe 2 into an agitator 4, where the oil is agitated in contact with concentrated sulphuric acid introduced through a pipe 6. The sludge produced in this treating operation is withdrawn from the agitator 4 through a valved drain pipe 8 while the oil is withdrawn through a valved pipe 10 and conducted into a second agitator 12 where the oil is brought into contact with a small proportion (about 1–3 lbs. per barrel of oil) of hydrated lime introduced through the conduit 14. The oil treated in this second agitator is preferably heated to a temperature of about 200° F., which heating may be effected by the use of a steam coil 16 mounted in this agitator.

The agitation of the oil in agitators 4 and 12 is preferably effected by the use of gas from a valved gas main 18, and which is passed by means of a pipe 20, a pump 22, to valved distributor pipes 24 and 26 which in turn discharge into the agitators 4 and 12 for the purpose of agitating the oil and treating agents therein. The agitators are preferably closed and the gas accumulated therein is preferably recirculated by means of outlet connections 28 and 30 which connect with the gas main 18 and pump 22. After the neutralization of the oil in chamber 12, the oil is withdrawn through a valved draw-off pipe 32 while the lime sludge is withdrawn through a valved drain pipe 34. From the pipe 32 the oil is conducted through one of two valved pipes 36 into either one of two filters 38, in which the oil is passed through a bed of decolorizing clay or fuller's earth. The filtered oil from the filters 38 is conducted by means of valved pipes 40 into a storage tank 42 from which the oil is drawn for further treatment. In some cases the oil has been found to filter better by passing it upwardly through the filter bed. This result may be obtained in the present instance by conducting the oil into the lower portion of the filters by means of valved pipes 39, while the filtered oil is conducted to storage 42 through the valved pipes 41.

The filters 38 are preferably used alternately so that while one filter is being discharged of spent clay and recharged, the other filter is in operation. The filters 38 are furthermore shown only diagrammatically and are not intended to represent any particular type of filter since either a filter press or an ordinary percolation filter may be used. In case it is desired to use a filter press the decolorizing clay is preferably mixed with the oil prior to being passed to the filter. This may be accomplished by any well-known mixing means inserted in the line 32.

The oil collected in storage tank 42 is conducted by means of a valved pipe 44 and pump 46 through a heat interchanger coil 48 mounted in a rectifying tower 50 and finally passed by means of a valved pipe 52 through a pipe still heater 54 in which the oil is heated to a temperature of from 450° to 600° F. The vapors and unvaporized oil are conducted from the heater 54 through a vapor line 56 into the base of the tower 40 and distributed by means of a distributor 58 into a body of oil maintained in the base of the tower. In order to control the temperature to which the oil is heated in heater 54, oil may be passed directly from pipe 44 through a valved pipe 55, and from coil 48 to pipe 56 through a valved bypass pipe 57.

The oil passed through the heater 54 comprises all of the various fractions of the crude oil being treated, all of which are maintained in intimate contact with each other until they leave the distributor 58, thus taking advantage of the presence of the lower boiling constituents to aid the vaporization of higher boiling fractions. The oil body in the base of tower 50 may be heated by a heating coil 59. The vapors leaving the body of oil in the base of the tower 50 are conducted through the opening in an inverted funnel-like partition 60 from which the vapors pass upwardly through the tower in heat exchange with the oil being passed through the coil 48 and with bodies of oil maintained on the bubbler trays in the tower. A portion of the bubble trays and bubble caps are shown diagrammatically in the drawing. In their passage upwardly through the tower the vapors are thoroughly rectified and cooled so that several fractions of the crude oil may be collected at different levels in the tower, and withdrawn as desired. The cut temperature on the tower is preferably maintained so that substantially only the gasoline vapors are discharged therefrom. These vapors are conducted from the top of the tower through a vapor line 62 and passed to a condenser 64, in which they are condensed and from which the condensate is conducted to a receiver 66. Condensate from receiver 66 may be passed by means of a pipe 68 and pump 70 back into the tower 50 for the purpose of cooling the vapors in the top of the tower and aiding in maintaining a proper cut temperature therein. The gasoline product collected in the receiver 66 may be conducted to storage by means of a valved discharge line 72. The invention is not limited to the use of a bubble plate tower but substantially the same results may be obtained by the use of a filled baffle plate tower.

In order to facilitate the oil distillation and rectification, and to secure non-oxidizing conditions during the treatment of the oil and during distillation, the gas used in the distributors 4 and 12 is preferably an inert gas containing no free or available oxygen or sulphur. A similar gas may be used during the distillation of the oil and for that purpose provision is made for conducting gas from the gas main 18 by means of valved pipes 74 and 76 into the oil feed line 44 in which the gas is intimately mixed with the oil and passed therewith through the preheating coil 48 and the pipe still furnace 54. When gas is used during the distillation of the oil, this gas will remain uncondensed in the condenser 64 and is therefore conducted from receiver 66 by means of a valved pipe 78 and passed into the lower portion of a gas purifier 80 in which the gas is scrubbed with caustic soda, soda ash solution, or other suitable purifying agent, for the removal of any impurities such as sulphur-containing gases and oxygen. From the scrubber 80 the purified gas is conducted by means of a gas line 82 and a pump 84 back into the pipe 76 for the purpose of recirculating the gas through the distilling system. In the event that there is an accumulation of uncondensible gas in the distilling circuit, the excess gas may be passed through the conduit 74 back into the gas main 18. The make-up gas either for the agitators or for the distilling system may be the non-condensible gases from a cracking unit, natural gas, or one or more of the relatively low boiling constituent hydrocarbons of natural gas. It is to be understood that any of these gases must be purified to remove any free or available oxygen or sulphur-containing gases prior to being used in the process.

Condensates may be withdrawn from the rectifying tower 50 by means of suitable valved draw-off pipes. For example, the combined kerosene and gas oil fractions may be withdrawn through a valved pipe 86 and passed to storage where the combined oil may be subsequently used as a cracking stock. If desired the gas oil and kerosene may be withdrawn from the tower by separate draw-off pipes. The lubricating oil fractions which are vaporized from the body of oil maintained in the base of the tower 50 are condensed in the lower portion of the tower above the partition 60, the lighter lubricants being withdrawn through a valved pipe 88 while the highest boiling fraction of the vapors condensed in the tower 50 is withdrawn through a valved pipe 90. The lubricating stock withdrawn through the valved pipe 88 is conducted into the upper portion of the baffled vacuum tower 92 in which the oil passes downwardly over a series of baffles and is finally withdrawn to storage through a valved pipe 94. The relatively heavy lubricant withdrawn through the pipe 90 is conducted into the lower portion of the vacuum tower 92 where it likewise passes over baffles and is finally withdrawn to storage through a valved pipe 96.

The vacuum tower 92 is used for stripping the absorbed gas and absorbed lighter constituents from the lubricating oils in order to give the same a proper fire and flash test. For this purpose a pressure of from 10 to 250 mm. of mercury is maintained on the vacuum tower by means of a vacuum pump 98 which withdraws the gas and lighter constituents through a pipe 100 and passes it into the base of the scrubber 80. The distillates passed into the vacuum stripper are maintained at a temperature of about 380° to 400° F. and subjected to the vacuum for four or five minutes. In order to facilitate the stripping of the lubricants, gas or steam may be introduced through a distributor 102 mounted in the base of the tower, but ordinarily this is not necessary. A temperature is preferably maintained in the base of the tower 50 below the cracking point of the oil, and such that substantially all of the crude oil will be vaporized except the heavy constituents which are suitable for steam cylinder stocks, which material may be withdrawn as a residue through the level controlled discharge pipe 104. These bottoms are also preferably stripped of absorbed gas and relatively light constituents either in a vacuum chamber such as 92 or in a small vaporizer where superheated steam or a hot gas may be used as a stripping agent.

Under some conditions it has been found very desirable to collect several of the desired lubricating distillate fractions withdrawn from the tower 50 as one distillate. This material is then preferably redistilled in a tower similar to tower 50 or may be stored and rerun through the tower 50 by introducing it through a valved pipe 106. The distillate to be rerun is introduced at this point because treatment with acid or filtering material is unnecessary.

In treating some crude oils it may be found unnecessary to subject the oil to the acid and lime treatment or that the clay treatment is sufficient to remove all of the undesirable constituents from the oil. In such case the crude is introduced directly to the filters through a valved inlet pipe 108, either before or after mixing the oil with clay depending upon the type of filter to be used.

From a commercial standpoint the process of the present invention has many advantages. For example, the presence of the gasoline and kerosene during the pretreating steps gives a more rapid separation of the oil from the sludges and avoids the necessity of diluting the oil with naphtha prior to filtration. Likewise, as pointed out above the presence of the lighter constituents permits the vaporization of the lubricating fractions of the oil at very low temperatures, which with the readily decomposable materials absent from the oil permits the direct production of bright clean lubricants. By the present process only pure refined oil is distilled and since the distillation is non-destructive only clean purified products result. The asphaltic materials and other unstable constituents which may catalyze the decomposition of the oil during the distillation are previously removed in the agitators and filters.

As a specific example of a crude oil treated in accordance with the above described process reference may be made to the following data and procedure employed in treating spindle top crude.

The crude oil was first contacted with about 5% by weight of 60° Bé. sulphuric acid which after separation of sludge was neutralized with lime and finally filtered with Floridine clay. The purified oil was then distilled in accordance with the process above described with a yield of 42% in lubricants. These lubricants were as follows:

lubricating oils, it has been impossible to obtain half the yield obtained by the process of the present invention.

Similar results have been obtained by the treatment of a mixture of Seminole crude and California crude and also Pennsylvania crude. In treating the Seminole crude mixture the yield of lubricants was about three times that obtainable by present commercial practice.

The use of 60° Bé. acid for treating the oil gives a relatively thin sludge which readily separates from the oil. The lime sludge on the other hand separates more slowly because of its content of calcium sulphide, and precipitated derivatives of naphthenic, sulphonic and sulphuric acids. In some cases the addition of a small amount of water to the agitator 12 increases the coagulation and rate of separation.

Having described the invention in its preferred form, what is claimed as new is:

1. The method of refining crude petroleum oil, which comprises agitating the oil to be treated with about 5% by weight of 60° Bé. sulphuric acid, separating acid sludge from the oil then agitating the oil with a small proportion of hydrated lime, thereby to remove from said oil the oil soluble sulphuric acid derivatives formed in said acid treatment, contacting the resulting oil with sufficient decolorizing clay to clarify and decolorize said oil, gradually heating the resulting purified crude oil to a temperature sufficient to vaporize all of the oil except the heavier constituents suitable for cylinder stock, and fractionating the resulting vapors into fractions comprising substantially, gasoline, kerosene, gas oil and lubricating oil distillates.

2. The process of producing a refined lubricant from crude petroleum oil without treating the same with chemicals or filtering materials after separation from the crude oil, which comprises treating the crude petroleum with about 5% by weight of 60° Bé. sulphuric acid, separating the oil from the acid sludge formed and mixing therewith a suitable quantity of lime for the purpose of fixing the oil soluble sulphonic and naphthenic acids in said oil, contacting the resulting oil with a decolorizing clay, and subjecting the thus treated crude oil to distillation and fractionation for the production of said refined lubricant.

3. The process of preparing a crude petroleum oil for the direct production of lubricants there-

| Yield | Kind of Oil | Viscosity | Flash | Fire | Pour | Color | Bloom |
|---|---|---|---|---|---|---|---|
| Per cent 24 | Cylinder stock | 130 sec. @ 210° F | 498 | 585 | 10° F | Dark red | Green |
| 11 | Medium | 300 sec. @ 100° F | | | Below 0° F | Straw | Do. |
| 7 | Spindle | 125 sec. @ 100° F | | | Below 0° F | Straw yellow | Do. |

These products as taken from the still require no further treatment to prepare them for market. The cylinder stock furthermore has such a low cold test that it may be blended with a cylinder stock from Seminole crude to produce a cylinder stock having a pour test of from 25° to 32° F. without impairing the lubricating properties of the resulting blend.

When spindle top crude has been treated by ordinary known methods for the production of from, which comprises treating the crude petroleum with about 5% by weight of 60° Bé. sulfuric acid to precipitate readily decomposable constituents contained in the crude oil, separating the treated oil from the acid sludge formed and mixing with the resulting oil a suitable quantity of lime for the purpose of fixing the oil soluble acids in said oil, and contacting the resulting oil with a decolorizing clay.

ERNEST F. ENGELKE.